(12) United States Patent
Vichare et al.

(10) Patent No.: US 10,649,875 B2
(45) Date of Patent: May 12, 2020

(54) PROVIDING RECOMMENDATION(S) FOR A COMPUTING DEVICE EXECUTING A GAMING APPLICATION

(71) Applicant: Dell Products L. P., Round Rock, TX (US)

(72) Inventors: Nikhil M. Vichare, Austin, TX (US); Abhinav Gupta, Austin, TX (US); Nikul Anil Ingley, Austin, TX (US)

(73) Assignee: Dell Products, L. P., Round Rock, TX (US)

( * ) Notice: Subject to any disclaimer, the term of this patent is extended or adjusted under 35 U.S.C. 154(b) by 121 days.

(21) Appl. No.: 16/016,970

(22) Filed: Jun. 25, 2018

(65) Prior Publication Data

US 2019/0391898 A1    Dec. 26, 2019

(51) Int. Cl.
| | |
|---|---|
| *G06F 11/34* | (2006.01) |
| *G06F 11/30* | (2006.01) |
| *A61F 13/70* | (2006.01) |
| *G06F 9/445* | (2018.01) |
| *G06F 8/65* | (2018.01) |
| *G06F 8/70* | (2018.01) |
| *A63F 13/77* | (2014.01) |
| *G06F 8/71* | (2018.01) |

(Continued)

(52) U.S. Cl.
CPC .......... *G06F 11/3428* (2013.01); *A63F 13/70* (2014.09); *A63F 13/77* (2014.09); *G06F 8/61* (2013.01); *G06F 8/65* (2013.01); *G06F 8/70* (2013.01); *G06F 8/71* (2013.01); *G06F 9/44505* (2013.01); *G06F 11/3051* (2013.01); *G06F 11/3438* (2013.01)

(58) Field of Classification Search
CPC .......... A63F 13/22; A63F 13/30; A63F 13/32; A63F 13/70; A63F 13/77; G06F 8/60; G06F 8/61; G06F 8/65; G06F 8/70; G06F 8/71; G06F 9/44505; G06F 11/3051; G06F 11/3428
See application file for complete search history.

(56) References Cited

U.S. PATENT DOCUMENTS 8,874,705 B1 * 10/2014 Satish .................. G06F 11/008
                                                          709/220
9,111,219 B1 *  8/2015 Mohla ..................... G06N 5/02
(Continued)

*Primary Examiner* — Glenn A. Auve
(74) *Attorney, Agent, or Firm* — Campbell Stephenson LLP; Shiv S. Naimpally

(57) ABSTRACT

In some examples, a server may receive, from a computing device, a device profile identifying a gaming application and metrics associated with execution of a gaming application. The server may compare the device profile with other device profiles associated with other computing devices, determine a similarity index of the device profile with the other device profiles, and select a subset of the other device profiles based at least in part on the similarity index. The server may determine configuration differences between the device profile of the computing device and individual device profiles of the subset of the other device profiles and send the configuration recommendations to the computing device. The recommendations may include at least one of (1) modifying settings of an operating system of the computing device, (2) modifying settings of the gaming application, (3) changing a hardware component or peripheral device associated with the computing device.

20 Claims, 8 Drawing Sheets

(51) Int. Cl.
  *G06F 8/61*   (2018.01)
  *A63F 13/70*  (2014.01)

(56) References Cited

U.S. PATENT DOCUMENTS

| | | | | |
|---|---|---|---|---|
| 2011/0320307 A1* | 12/2011 | Mehta | ............... | G06Q 30/0251 |
| | | | | 705/26.7 |
| 2012/0209571 A1* | 8/2012 | Peterson | ............ | G06F 11/3616 |
| | | | | 702/186 |
| 2013/0080761 A1* | 3/2013 | Garrett | ............... | G06F 11/3414 |
| | | | | 713/100 |
| 2013/0085886 A1* | 4/2013 | Satish | ................... | G06Q 30/02 |
| | | | | 705/26.7 |
| 2014/0114901 A1* | 4/2014 | Pradhan | ............ | G06Q 30/0631 |
| | | | | 706/50 |
| 2015/0038130 A1* | 2/2015 | Mao | ................... | G06F 9/44505 |
| | | | | 455/418 |
| 2016/0092768 A1* | 3/2016 | Patil | ........................ | G06F 8/61 |
| | | | | 706/46 |
| 2016/0283362 A1* | 9/2016 | Seto | ................... | G06F 11/3688 |
| 2016/0291989 A1* | 10/2016 | Spitzer | ................... | A63F 13/52 |
| 2019/0370139 A1* | 12/2019 | Vichare | ............... | G06F 9/44505 |

* cited by examiner

PROVIDING RECOMMENDATION(S) FOR A COMPUTING DEVICE EXECUTING A GAMING APPLICATION

BACKGROUND OF THE INVENTION

Field of the Invention

This invention relates generally to computing devices and, more particularly to determining a profile of a computing device that includes a configuration of the computing device and metrics associated with one or more particular applications (e.g., games), performing a comparison of the profile with a set of other profiles of other computing devices, and determining recommendations for the computing device based on the comparison.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Users who make use of their computing devices to play games are often referred to as gamers. Though gamers may represent a relatively small portion of computer users, most gamers tend to outspend non-gamers when it comes to computing-related purchases. For example, gamers may spend more money than non-gamers to purchase additional hardware, such as, for example, additional memory and/or high-speed memory, a high-performance video card, and the like. Gamers may also spend more money than non-gamers to purchase peripherals, such as dual monitors, large screen monitors, higher resolution monitors, external storage devices (e.g., to backup game play), and the like. Thus, gamers represent an important market segment for computer manufacturers.

However, currently there are no recommendation systems that can analyze a configuration of a particular computing device and make specific recommendations for improving performance of a particular game.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, an agent on a computing device may create a device profile that includes (1) a hardware configuration including hardware components and peripheral devices associated with the computing device, (2) information on which gaming applications are installed on the computing device and how often each gaming application is played, and (3) metrics associated with each gaming application, such as, for example, average frame rate, minimum frame rate, maximum frame rate, actions per minute, number of monitors supported, output resolution (e.g., 720p, 1080o, 4 k, and the like), benchmark data, and the like. The agent may periodically (e.g., at a predetermined time interval) or in response to a user request, send the device profile to a server for analysis. In response, the computing device may receive one or more recommendations from the server.

The server may receive, from the computing device, the device profile identifying a gaming application and metrics associated with execution of the gaming application. The server may compare the device profile with other device profiles associated with other computing devices, determine a similarity index of the device profile with the other device profiles, and select a subset of the other device profiles based at least in part on the similarity index. The server may determine configuration differences between the device profile of the computing device and individual device profiles of the subset of the other device profiles and send the configuration recommendations to the computing device. The recommendations may include at least one of (1) modifying settings of an operating system of the computing device, (2) modifying settings of the gaming application, (3) changing a hardware component or peripheral device associated with the computing device. In some cases, the agent may automatically perform one or more of the recommendations, such as, for example, modifying settings of the operating system or modifying settings of the gaming application.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
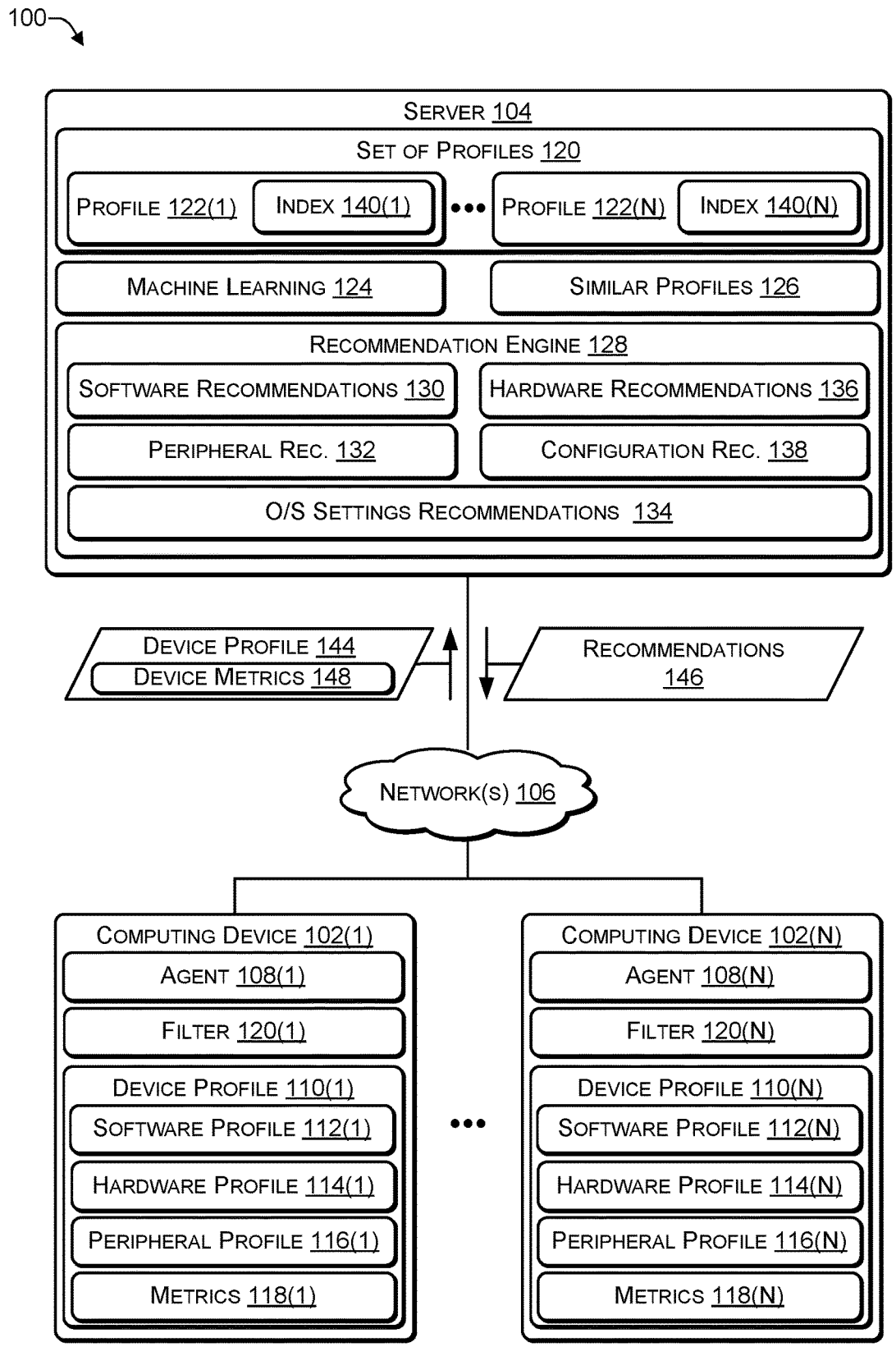
FIG. 1 is a block diagram of a system that includes a computing device and a recommendation server, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein provide examples of an IHS in which an agent on a computing device gathers information about the operating system and software applications (e.g., what is installed and how each is configured) and hardware components (including peripherals) of the computing device. Each time execution of a gaming application is initiated, the agent may monitor the execution of the gaming application and gather various metrics, such as, for example, a frame rate (e.g., frames per second (FPS)) at a particular video resolution, average frame rate, actions per minute (APM), video RAM (VRAM) usage, time to completion, and the like. The agent may create a device profile based on the gathered information. The agent may periodically (e.g., at a predetermined interval) send the device profile to a server. In response to receiving the device profile, the server may compare the device profile with other device profiles of other computing devices to identify similar profiles (e.g., computing devices playing the same or similar game). The server may analyze the similar profiles that execute the same (or similar) gaming application(s) with better metrics (e.g., greater FPS, greater APM, shorter completions, and the like) and send one or more recommendations to the computing device to improve the gaming metrics. The term improve as used herein refers to increasing a gaming metric (e.g., FPS, video resolution, a benchmark metric, and the like) when a larger number indicates increased performance and refers decreasing a gaming metric (e.g., response time, latency, completion time, and the like) when a smaller number indicates increased performance. The recommendations may include modification(s) to settings of an operating system (0/S) of the computing device, modification(s) to settings of one or more gaming application(s), peripheral upgrades (e.g., monitor with a faster response speed, gaming mouse or other controller, and the like), hardware upgrades (e.g., faster drive, faster or overclocked processor, and the like), another modification, or any combination thereof. In some cases (e.g., recommendations to modify O/S settings and/or application settings), the agent may automatically (e.g., without human interaction) perform the modifications. In other cases, the agent may present one or more offers to purchase upgrades, e.g., additional hardware and/or peripherals. The offers may indicate an estimated change in one or more metrics if the upgrades are purchased, e.g., "Upgrading from a conventional drive to a 1 terabyte (TB) solid state drive (SSD) for $200 may increase video performance up to 100%, e.g., from 30 FPS up to 60 FPS. If upgrading to an SSD, then change a basic input output system (BIOS) setting associated with hard drives from 'IDE or RAID' to 'AHCI'." In some cases, the recommendations may include multiple tiered offers, e.g., (1) change O/S and/or application settings to improve one or more metrics at no cost, (2) perform a first hardware and/or peripheral upgrade for $X, along with the changes to the O/S and/or application settings, to further improve one or more metrics, (3) perform a second hardware and/or peripheral upgrade for $Y (where Y>X), along with the changes to the O/S and/or application settings, to even further improve one or more metrics, and the like.

The server may compare the device profile to other device profiles of other computing devices and identify a subset of device profiles that are similar (e.g., in terms of the gaming application(s) that are executed) to the device profile of the computing device. The device profile may indicate that the gaming applications that are executed on the computing device include Fortnite, Call of Duty, and Grand Theft Auto. The subset of similar device profiles may include the device profiles associated with computing devices that execute one or more of the games Fortnite, Call of Duty, or Grand Theft Auto. The server may analyze the subset of device profiles that are similar to the device profile of the computing device to identify differences in the configurations (e.g., O/S settings, application settings, hardware, peripherals, and the like) of the similar computing devices that correspond to the similar device profiles. Based on the differences, the server may determine recommendations and send the recommendations to the computing device. Based on the recommendations, the agent may automatically implement (e.g., modify) at least one 0/S setting or gaming application setting. For example, the computing device may include two disk drives and the operating system may be installed on and access a first (e.g., primary) disk drive. The recommendations may include automatically changing the settings of the gaming application to use a second (e.g., non-primary) disk drive instead of the first disk drive to avoid both the gaming application and the operating system contending for access to the first disk drive, thereby speeding up disk access for the gaming application. As another example, the recommendations may include automatically updating a driver and/or a firmware of a hardware component (e.g., networking card, graphics card, or the like) to improve one or more performance metrics.

Some recommendations may include an offer to purchase additional software, hardware, or peripheral devices. The recommendations may include upgrading existing software (e.g., from an older version to a newer version), installing new software, upgrading hardware, and upgrading one or more peripheral devices. For example, the user may be provided with a recommendation to upgrade (e.g., purchase an upgrade) from one particular edition or version of a software application to a newer or more powerful version of the same software application. To illustrate, a newer version of a game, e.g., Grand Theft Auto version IV (compared to version I, II, and III), may take advantage of particular features of central processing units (CPUs), such as hyperthreading and particular features of graphics processing units (GPUs), such as hardware acceleration, de-interlacing, scaling, and the like. By using these particular CPU and GPU features, the newer version of a particular page may provide better metrics, such as increased FPS generation, increased APM, higher resolution video output (e.g., 4 k instead of 1080p), and the like. The recommendations from the server may include information indicating the amount of improvement associated with individual recommendations. The recommendations may include special offers, such as discounts or coupons, to purchase a newer software version, new hardware (e.g., faster CPU, faster graphics card, and the like), and/or a new peripheral (e.g., a specialized gaming controller, such as a gaming mouse, etc.).

Thus, a manufacturer may install a software agent ("agent") on each computing device (e.g., tablet, laptop, desktop, and the like) that the manufacturer sells or leases. The agent may gather various information, including (1) software information (e.g., including installed gaming applications and settings associated with each gaming application, driver versions, and the like) of the computing device, (2) hardware information (e.g., including CPU information, GPU information, firmware version, capability to support virtual reality (VR), and the like) of the computing device, (3) peripheral information (e.g., including monitor refresh rate, monitor response time, controller actuation speed, and the like) of the computing device, and (4) gaming-related metrics, such as which games are played, how often each game is played in a particular time period, average amount of time each game is played per day, minimum/maximum/average frame rate (in FPS) for each game, game resolution (e.g., 720p, 1080p, 4 k, and the like).

The agent may filter the gathered information to remove personally identifiable information (PII) to preserve the anonymity of the data source. The PII may include username, password, financial institution account-related data, such as credit card-related data, bank account related data (e.g., account number, personal identification number (PIN), and the like), address-related data (e.g., house number, street name, zip code, etc.), phone number-related data, social security-related data, and other information that could potentially be used to identify a user of the computing device. The agent may periodically (e.g., at a predetermined time interval) send the gathered information (e.g., telemetry data) to a server, such as a cloud-based server associated with the manufacturer of the computing device.

A device profile (also referred to herein as a usage profile) may include a unique identifier that is associated with each computing device. For example, the unique identifier may include a serial number, a service tag, or another type of identifier that uniquely identifies the computing device.

The manufacturer's server (e.g., cloud) may receive the device profiles of multiple devices, e.g., millions of computing devices, and perform assessments about what hardware upgrades, software upgrades, peripheral upgrades, and the like may be performed to improve game performance and game metrics. The server may perform the assessment of a particular device profile by comparing the particular device profile to other device profiles to identify a subset of device profiles that are similar to the particular device profile. Similar means that the similar devices execute one or more gaming applications that are the same (or similar) to the gaming applications executed by the particular computing device. In some cases, the server may determine the subset of similar devices by performing a comparison of the particular device profile with individual ones of the other device profiles and determining a similarity index, such as a Jaccard index, to quantify the similarity. After the server performs the assessment, the server may analyze the device profiles of each device in the subset of similar devices to determine recommendations. By identifying other devices with similar hardware configurations, similar peripherals, and the same (or similar) gaming applications, the server may identify modifications to operating system settings, modifications to gaming application settings, modifications to firmware (e.g., BIOS) settings, modifications to hardware settings (e.g., set via software), modifications to firmware settings (e.g., set via software), modifications to peripheral settings, software upgrades, hardware upgrades, and peripheral upgrades that can be used to improve performance metrics for the gaming applications that the computing device (associated with the particular device profile). The improved performance metrics may include higher resolution output (e.g., 4 k instead of 1080p), faster frame generation (e.g., 60 FPS instead of 30 FPS), dual monitor support (e.g., dual 4 k monitors instead of a single 4 k monitor), increased BAPCo SYSmark score, increased Futuremark PCMark score, increased Futuremark 3DMark score, increased CINEBENCH score, and the like.

The device profile may identify hardware components and software applications that are currently installed on the computing device, peripheral devices that have been connected to the computing device, when they are plugged in, how long they are plugged in, and the like. The device profile may identify which peripherals have been attached to the computing device, how often each peripheral is used (daily, weekly, etc.), and how the peripheral is used (e.g., display video output, provide input, etc.).

In some cases, recommendations may be made using software usage profiles. For example, the agent may create a software usage profile associated with a computing device and send the software usage profile to a cloud-based server. The server may compare the software usage profile with other software usage profiles of other computing devices and identify similar usage profiles. The server may perform an analysis of the differences between the software usage profile and the other software usage profiles and make recommendations based on the differences. For example, the software usage profile may indicate that 2 gaming applications are being played (executed) on the computing device. The similar usage profiles of the other computing devices may have 1 or more of the same (or similar) gaming applications. The server may analyze the similar usage profiles, identify the differences, e.g., settings, hardware components, and/or peripheral components, and make recommendations based on the differences. For example, the other similar devices with similar usage profiles may use a particular gaming application and may have an SSD installed or have a particular video card installed. The recommendation may include an offer to purchase an SSD or the particular video card. The recommendation may indicate an approximate improvement to one or more metrics associated with implementing the recommendations. For example, the recommendations may include additional random-access memory (RAM) with higher access speeds than the current RAM, a higher performance video card that the current video card, a faster disk drive (e.g., a solid-state drive (SSD) or 7200 revolutions per minute (RPM) drive rather than a 5400 rpm drive), cooling (e.g., liquid cooling instead of fan cooling to enable faster clock speeds and overclocking), and the like.

As an example, a computing device may include one or more processors and one or more non-transitory computer readable media storing instructions executable by one or more processors to perform various operations. The operations may include, at a pre-determined time interval (e.g., every second, every minute, every hour, every X number of hours (X>0), every day, every week, every month, or the like), (1) determining a hardware configuration of the computing device, (2) determining a software profile of individual gaming applications installed on the computing device, (3) determining a hardware profile of individual hardware components included in the hardware configuration, and (4) determining a peripheral profile identifying peripheral devices connected to the computing device. The operations may include creating a device profile based at least in part on the hardware profile, the software profile, and the peripheral profile and sending the device profile to a server. The operations may include receiving one or more configuration recommendations from the server and automatically (e.g., without human interaction) modifying at least one of (1) the hardware configuration (e.g., hardware settings) or (2) the software configuration (e.g., operating system settings and/or gaming application settings) to create a modified computing device. The operations may include determining that a gaming application installed on the computing device has improved metrics (e.g., greater frame rate, lower latency, faster response time, or the like).

The server may include one or more processors and one or more non-transitory computer readable media storing instructions executable by one or more processors to perform various operations. The operations may include receiving, from a computing device, a device profile identifying a gaming application and metrics associated with execution of the gaming application by the computing device. The device profile may include: a hardware profile that identifies: (a) one or more hardware components associated with the computing device, including: components included in the computing device, and (b) peripheral devices connected to the computing device. The peripheral devices may include at least one display device and at least one gaming controller. The device profile may include the metrics associated with execution of the gaming application, such as, for example, a video resolution, an average frame rate, and an average number of actions per minute. The operations may include performing a comparison of the device profile with other device profiles associated with other computing devices and determining, based on the comparison, a similarity index of the device profile with the other device profiles. Performing the comparison of the device profile with the other device profiles associated with other computing devices may include comparing the hardware profile of the computing device with a particular hardware profile of the particular other computing device of the other computing devices and comparing the metrics with other metrics associated with the gaming application being executed by the other computing devices. The similarity index of the device profile may include one a Jaccard index, a simple matching coefficient, a Hamming distance, a Sorensen-Dice coefficient, a Tversky index, or a Tanimoto distance. The operations may include selecting a subset of the other device profiles based at least in part on the similarity index and determining one or more configuration differences between the device profile of the computing device and individual device profiles of the subset of the other device profiles. The one or more configuration differences may include at least one of: (1) a software configuration difference between: a first software setting of the gaming application that is installed on the computing device; and a second software setting of the gaming application installed on at least one device of the subset of the other computing devices, (2) an operating system setting difference between: a first operating system setting of an operating system that is installed on the computing device and a second operating system setting of the operating system installed on at least one device of the subset of the other computing devices, or (3) a hardware configuration difference between a hardware configuration of: a hardware component associated with the computing device and the hardware component associated with at least one device of the subset of the other computing devices. The operations may include determining one or more configuration recommendations based on the one or more configuration differences and sending the one or more configuration recommendations to the computing device. The one or more configuration recommendations may include at least one of: (1) one or more software configuration modifications to a software configuration of the gaming application that is installed on the computing device, (2) one or more operating system settings modifications to the operating system that is installed on the computing device, (3) one or more hardware configuration modifications to a hardware configuration of at least one hardware component that is included in the computing device, or (4) one or more peripheral configuration modifications to a peripheral configuration at least one peripheral device that is associated with the computing device. The one or more configuration recommendations comprise at least one of: (1) installing, on the computing device, a newer version of a particular gaming application, (2) uninstalling, from the computing device, a currently installed hardware component, (3) installing, in the computing device, a particular hardware component, or (3) connecting a recommended peripheral device to the computing device. In some cases, the computing device may automatically apply at least some of the recommendations to the computing device. For example, the computing device may, after receiving the recommendations from the server, automatically (1) uninstall a currently installed software application, (2) install a particular software application, (3) disable a currently installed hardware component to prevent the hardware component from being used, (4) update a firmware or a driver associated with a particular hardware component, (5) update a firmware or a driver associated with a peripheral device that is connected to the computing device.

FIG. 1 is a block diagram of a system 100 that includes a computing device and a recommendation server, according to some embodiments. The system 100 may include multiple computing devices 102 coupled to a server 104 via one or more networks 106. For example, the computing devices 102 may include a computing device 102(1) to computing device 102(N) (where N is greater than 0). The computing devices 102 may include one or more of a laptop, a tablet, a desktop, a smart phone, or another type of computing device.

Each of the computing devices 102 may include an agent 108 and a device profile 110. For example, the computing device 102(1) may include an agent 108(1) and a device profile 110(1). The computing device 102(N) may include an agent 108(N) and a device profile 110(N). Each of the device profiles 110 may include a software profile 112, a hardware profile 114, a peripheral profile 116, and metrics 118. For example, the computing device 102(1) may include the device profile 110(1) that includes a software profile 112(1), a hardware profile 114(1), the peripheral profile 116(1), and metrics 118(1). The device profile 110(N) may include a software profile 112(N), a hardware profile 114(N), a peripheral profile 116(N), and metrics 118(N). Each of the software profiles 112 may include information as to gaming applications installed on the corresponding computing device 102, which applications are being used and which are not being used, how frequently each application is being used, a length of time each software applications is used, and the like. For example, the device profile 110(N) may indicate that the computing device 102(N) currently has five gaming applications installed. Two of the gaming applications may be used while three of the gaming applications may not be used. Of the two applications that are used, a first application may be used an average of two hours every day and a second application may be used an average of one hour every day.

The hardware profile 114 may indicate may include information identifying hardware components that are installed in the corresponding computing device 102 and usage data associated with each hardware component, such as, for example, an amount of utilization of each hardware component, when each hardware component is used, for how long, and the like. For example, the hardware profile 114(N) may indicate that the computing device 102(N) includes an i7 processor, the turbo boost feature of the processor (e.g., which temporarily increases the clock speed) is used an average of 20 minutes every day, an average throughput of the hard drive is X megabits per second (X>0), that the computing device 102(N) connects to other devices using an Ethernet® port and that Wi-Fi is not used, the universal serial bus (USB) ports are used 100% of the time, the Thunderbolt® port is being used, and the like.

The peripheral profile 116 may indicate which peripherals (e.g., number of monitors, number of input devices, type of gaming controllers, and the like) are currently connected to the corresponding computing device 102, which peripherals were previously connected to the corresponding computing device 102, when the peripherals are connected, a length of time that the peripherals are connected, how much each peripheral is used when connected, and so on. For example, the peripheral profile 116(N) may indicate that a user plugged a 27" 1080p monitor into the computing device 102 via a High-Definition Multimedia Interface (HDMI) port for a particular period of time on particular days of the week. As another example, the peripheral profile 116(N) may indicate that a gaming mouse was connected to the computing device 102(N) via a USB port on a particular date and is currently still connected to the computing device 102(N).

The metrics 118 may include, for each gaming application that has been executed on the corresponding computing device 102, a frame rate (e.g., frames per second (FPS)) at particular video resolutions (e.g., 720p, 1080p, 4 k, and the like), an average frame rate, a minimum frame rate, a maximum frame rate, a number of dropped frames, actions per minute (APM), video RAM (VRAM) usage, time to completion, and the like. In some cases, the metrics 118 may include one or more benchmark scores, such as, for example, BAPCo SYSmark score, Futuremark PCMark score, Futuremark 3DMark score, CINEBENCH score, and the like. For example, the agent 108 may determine when the computing device 102 is not being used (e.g., no input detected for more than a threshold amount of time) and execute one or more benchmarks during those times.

Each of the computing devices 102 may include a privacy filter 120. For example, the computing device 102(1) may include a filter 120(1) and the computing device 102(N) may include a filter 120(N). The filter 120 may scan the device profile 110 and remove data, such as, for example, personally identifiable information (PII), e.g., information that can be used by itself or in conjunction with other information to identify, contact, or locate one or more users of the corresponding computing device 102. For example, the filter 120 may scan and remove (e.g., filter out) information such as, for example, username, password, phone numbers, email addresses, credit card or other financial information (e.g., last four digits of an account number, personal identification number (PIN) number, and the like), and other information that could enable identification of personal information associated with a user of each computing device 102. The filter 120 may be applied before sending one of the device profiles 110 (or at least a portion thereof) to the server 104. Thus, the agent 108 may gather data to create the device profile 110 and apply the filter 120 to remove PII from the device profile 110.

The server 104 may include a set of profiles 120 that include a profile 122(1) to a profile 122(N). Each of the profiles 122 may be associated with one of the computing devices 102. For example, the profile 122(1) may be associated with the computing device 102(1) and the profile 122(N) may be associated with the computing device 102(N). The server 104 may include a machine learning module 124 that uses machine learning (e.g., support vector machine, or other machine learning) to identify similar profiles 126 that are similar to a device profile 144 (e.g., one of the device profiles 110) received from a particular one of the computing devices 102. For example, the machine learning module 124 may compare the device profile 144 with at least a portion of the profiles 122 to identify similar profiles 126, e.g., a subset of the set of profiles 120 that are similar to the device profile 144.

The server 104 may include a recommendation engine 128. The recommendation engine may compare the device profile 144 to the similar profiles 126 to identify differences and make recommendations, including one or more of, for example, software recommendations 130, peripheral recommendations 132, O/S settings recommendations 134, hardware recommendations 136, and/or configuration recommendations 138.

The similar profiles 126 may be determined by comparing the device profile 144 (e.g., one of the device profiles 110 sent from one of the computing devices 102) with at least a portion of the profiles 122 and determining a similarity index 140 (e.g., a Jaccard index, a simple matching coefficient, a Hamming distance, a Sorensen-Dice coefficient, a Tversky index, or a Tanimoto distance, or the like) for individual ones of the profiles 122. For example, the index 140(1) may indicate how close the profile 122(1) is to the device profile 144 and the index 140(N) may indicate how close the profile 122(N) is to the device profile 144. To create the similar profiles 126 (e.g., a subset of the profiles 122), the recommendation engine 128 may identify particular profiles from the set of profiles 120 that have a similarity index that indicates that the particular profiles are similar to the device profile 144. The recommendation engine 128 may compare the software profile, hardware profile, and/or peripheral profile of the device profile 144 to the similar profiles 126 to identify one or more of the recommendations 130, 132, 134, 136, and 138. For example, the similar profiles 126 may each have a hardware configuration that is similar (or identical) to the hardware configuration of the device profile 144. To illustrate, the similar profiles 126 may have the same (or similar) model computing device as the computing device associated with the device profile 144, the same (or similar) type of CPU (e.g., Intel® i3, i5, i7, or the like) as the computing device associated with the device profile 144, the same (or similar) GPU as the computing device associated with the device profile 144, the same (or similar) video card as the computing device associated with the device profile 144, the same (or similar) monitor as the computing device associated with the device profile 144, the same (or similar) gaming controller as the computing device associated with the device profile 144, another similar hardware or peripheral, or any combination thereof. The similar profiles 126 may indicate that the corresponding similar computing device execute similar (or identical) gaming applications as the computing device associated with the device profile 148. The computing device associated with the device profile 144 may include a particular set of device metrics 148. The similar profiles 126 may indicate that other similarly configured computing devices have one or more metrics that are better (e.g., greater FPS, shorter response time, faster completion, and the like) compared to the device metrics 148.

The software recommendations 130 may include one or more recommendations to uninstall a particular software application or install a newer version of a gaming application. For example, the recommendation engine 128 may recommend to uninstall an application that is running a background process that slows down gaming applications. As another example, the recommendation engine 128 may recommend to install a new version of a gaming application because the new version can generate increased resolution output (e.g., 4 k rather than 1080p), increased frame rate (e.g., 60 FPS rather than 30 FPS), or the like. In some cases, such as when the software recommendation can be performed without paying a fee (e.g., upgrade fee), the agent 108 may automatically (e.g., without human interaction) perform the software recommendation. For example, the software manufacturer may create a new version of the software that is a free upgrade to existing users that addresses a bug and/or improves performance. In such cases, the agent 108 may automatically upgrade the software application to the new version based on the software recommendations 130.

The hardware recommendations 136 may identify one or more hardware modifications that the user can perform to the computing device 102 to improve the device metrics 148. For example, if the user appears to be running out of space on a hard drive, the hardware recommendations 136 may include upgrading to a larger hard drive. As another example, the user may perform a large number of input/output (I/O) operations to the hard drive that consume a large amount of time. The hardware recommendations 136 may include a suggestion to upgrade from a conventional hard disk drive to a solid-state drive (SSD) that is much faster at performing the I/O operations that the user frequently performs. As yet another example, the hardware recommendations 136 may include a recommendation that the user increase an amount of main memory (e.g., random access memory (RAM)) as applications are constantly swapping from memory to disk due to the size of the gaming applications or due to the size of the files being modified by the gaming applications. By upgrading from 2 gigabytes (GB) of RAM to 8 GB of RAM, the metrics 118 associated with the computing device 102 may be improved. In some cases, such as when the hardware recommendation can be performed without paying a fee (e.g., upgrade fee), the agent 108 may automatically (e.g., without human interaction) perform the hardware recommendation. For example, the hardware recommendations 136 may include updating a hardware driver or updating a firmware of a particular hardware component. In such cases, the agent 108 may automatically download and install a latest version of a particular driver or a particular firmware associated with the particular hardware component.

The peripheral recommendations 132 may include replacing a particular peripheral with a different particular peripheral or adding a new peripheral. For example, the peripheral recommendations 132 may include a recommendation to upgrade to a newer gaming mouse (e.g., that uses newer technology) with higher resolution. As another example, the peripheral recommendations 132 may include a recommendation to install a specialized controller. To illustrate, if the gaming application being used includes a car simulation game (e.g., Need for Speed, Gran Turismo, Forza Motorsport, and the like), the recommendation may include a specialized gaming controller featuring a steering wheel, a brake pedal, a gas pedal, and paddle shifters. In some cases, such as when the peripheral recommendation can be performed without paying a fee (e.g., upgrade fee), the agent 108 may automatically (e.g., without human interaction) perform the peripheral recommendation. For example, the peripheral recommendations 132 may include updating a driver or updating a firmware of a particular peripheral component (e.g., mouse, controller, VR goggles, or the like). In such cases, the agent 108 may automatically download and install a latest version of a driver or of firmware associated with the particular peripheral component.

The O/S settings recommendations 134 may include one or more recommendations related to an operating system of the computing device. For example, the recommendation may include modifying one or more settings associated with the operating system to improve the device metrics 148.

The configuration recommendations 138 may include recommendations for reconfiguring settings of one of the computing devices 108 to improve the metrics 118. For example, the computing device 102(N) may include two disk drives, a first drive on which the operating system is installed and a second drive. The configuration recommendations 138 may include changing the options associated with a gaming application to create temporary files on the second drive to avoid contending with the operating system to access the first drive. By moving the creation of temporary files from a first disk drive to a second disk drive, the gaming application can access the second disk drive without contention from other applications and the O/S, thereby speeding up disk-related operations. As another example, the configuration recommendations 138 may include recommendations to modify the basic input/output system (BIOS) of the computing device 102. For example, modifying one or more options in the BIOS may enable read and write operations to the disk drives to be performed faster. The configuration recommendations 138 may include recommendations on configuring various parameters associated with one or more gaming applications to improve the corresponding metrics 118. As yet another example, the configuration recommendations 138 may include a recommendation to plug a USB 3.0 compatible peripheral into a USB 3.0 port rather than a USB 2.0 port to take advantage of the faster throughput of USB 3.0.

Thus, the agent 108(N) may create the usage profile 110(N) associated with the computing device 102(N) that includes the hardware profile 114(N), the software profile 112(N), the peripheral profile 116(N), and the metrics 118(N) and send the usage profile 144 to the cloud-based server 144. The server 104 may compare the software usage profile 112(N) with other software usage profiles of other computing devices in the set of profiles 120 to identify the similar profiles 126. The server 104 may perform an analysis of the differences between the hardware usage profile 114(N) of the computing device and other hardware usage profiles of the similar profiles 126 and make recommendations based on the differences. For example, the software usage profile 112(N) may indicate two gaming applications that are being used on the computing device 102(N) and their corresponding metrics. The similar usage profiles of the other computing devices may execute one or both gaming applications. The server 104 may analyze the similar profiles 126, identify hardware differences, software differences, peripheral differences, and configuration differences, and make hardware recommendations 136 based on the differences. For example, the other similar computing devices may have more RAM or use an SSD (instead of a conventional disk drive) to perform the same (or similar) tasks that include disk I/O faster. The recommendations 146 may include a recommendation and an offer to purchase a RAM upgrade or an SSD.

Thus, each of the computing devices 102 may have an agent 108 that gathers information about the software configuration, the hardware configuration, and peripherals associated with the computing device 102 and how they are being used. For example, the agent 108 may gather information about which gaming applications are installed, which gaming applications are being used, how long each gaming application is being used, tasks (e.g., frequency with which RAM is accessed, hard drive is accessed, GPU is accessed, VRAM is accessed, and the like) that each gaming application is performing, and the like. The agent 108 may keep track of various metrics 118 that occur on the computing device 102. The agent 108 may create the device profile 110 that includes the software profile 112, the hardware profile 114, the peripheral profile 116, and the metrics 118. The agent 108 may gather information on software usage, hardware usage, peripheral usage, and events at a predetermined time interval and/or when an event occurs or when usage of a software application, hardware component, or peripheral is detected and update the device profile 110.

After the agent 108 has gathered the information, the agent 108 may apply a filter 120 to the information in the device profile 110 to filter out PII that could potentially be used to identify a user of the computing device 108. For example, the filter 120 may be used to remove personally identifiable information (PII) from the device profile 110. The filter 120 may, for example, remove information such as telephone numbers, street addresses, legal names, credit card information, insurance information, social security information, or other confidential information.

After the agent 108 has applied the filter 120 to the information in the device profile 110, the agent 108 may send device profile 144, e.g., one of the device profiles 110(1) to 110(N), to the server 104. The server 104 may compare the device profile 144 with other profiles from the set of profiles 120. For example, if the device profile 144 is associated with the computing device 102(N), then the device profile 144 (e.g., the device profile 110(N)) may be compared to at least some of the profiles 122(1) to 122(N−1) corresponding to the computing devices 102(1) to 102(N−1). The comparison may be performed by a software component executing on the server 104, such as the machine learning module 124. The machine learning module 124 may identify the similar profiles 126 that include profiles from the set of profiles 120 that are similar to the device profile 144 in terms of hardware components, gaming applications, peripherals and the like. The recommendation engine 128 may analyze the similar profiles 126 to identify recommendations that can be provided to improve the performance metrics 118(N). For example, assume the computing device 102(N) sends the device profile 144 to the server 104, and the recommendation engine 128 determines that the computing device 102(1) is similar to the computing device 102(N), e.g., the software profile 112(1) is similar to (or the same as) the software profile 112(N), the hardware profile 114(1) is similar to (or the same as) the hardware profile 114(N), the peripheral profile 116(1) is similar to (or the same as) the peripheral profile 116(N), the metrics 118(1) are similar to the metrics 118(N), or any combination thereof. For example, the recommendation engine 128 may determine that the same gaming application is installed on both the computing device 102(1) and the computing device 102(N), but the gaming application mas improved metrics on the computing device 102(1) compared to the computing device 102(N). For example, the recommendation engine 128 may analyze the device profile 110(1) and determine that the reason why the software application executes faster is because the computing device 102(1) has an SSD for the main drive whereas the computing drive 102(N) has a conventional hard disk drive. In this example, the recommendations 146 provided by the recommendation engine 128 may include a recommendation that the computing device 102(N) be upgraded from the conventional disk drive to an SSD. As another example, the recommendation engine 128 may determine that the computing device 102(1) has twice the main memory (RAM) as the computing device 102(N) resulting in a particular software application executing faster on the computing device 102(1) as compared to the computing device 102(N). The recommendation engine 128 may make a hardware recommendation 136 that the computing device 102(N) be upgraded to increase the amount of RAM in the computing device 102(N), e.g., from 2 GB to 4 GB, from 4 GB to 8 GB or from 8 GB to 16 GB.

The recommendation engine 128 may determine a similarity index 142 when comparing the device profile 144 with profiles in the set of profiles 120 to identify the similar profiles 126. For example, assume one of the computing devices 102 is uniquely identified by a service tag or serial number Si and has a set of M hardware components and peripherals (e.g., CPU, video card, SSD, 4 k monitor, and the like), where 6>M>0.

$$Si=\{a1,a3\}$$

$$Sj=\{a2,a3,a5\}$$

In this example, device Si has components a1 and a3, installed but does not have components a2, a4, and a5. Device Sj has components #2, #3, and #5, installed but does not have components #1 and #4.

A similarity index, such as a Jaccard similarity, may be determined between Si and Sj as $$J_{ij} = \frac{|S_i \cap S_j|}{|S_i \cup S_j|}$$

The similarity index may be determined for each pair of devices and stored in a similarity matrix as illustrated by Table 1 below:

TABLE 1

|           | Device S1 | Device S2 | Device S3 | Device S4 | Device S5 |
|-----------|-----------|-----------|-----------|-----------|-----------|
| Device S1 | 1         | j         | j         | j         | j         |
| Device S2 | j         | 1         | j         | j         | j         |
| Device S3 | j         | j         | 1         | j         | j         |

TABLE 1-continued

| | Device S1 | Device S2 | Device S3 | Device S4 | Device S5 |
|---|---|---|---|---|---|
| Device S4 | j | j | j | 1 | j |
| Device S5 | j | j | j | j | 1 |

The machine learning model 124 may be trained using training data to enable the machine learning model 124 to determine what amount of j indicates a similarly equipped device.

Using the similarity matrix of Table 1, for a given service tag (or serial number) that uniquely identifies a computing device, the server 104 may search for service tags such that:

$$S_x \in \text{selected\_taglist if } j_{(selected\_tag, x)} <= T$$

In the above equation, T is the threshold for Jaccard similarity. After the identities (e.g., service tags or serial numbers) of similar devices have been identified, the components to recommend may be determined as follows:

$$(S_x \cup S_{selected}) - (S_x \cap S_{selected})$$

Figure 2:
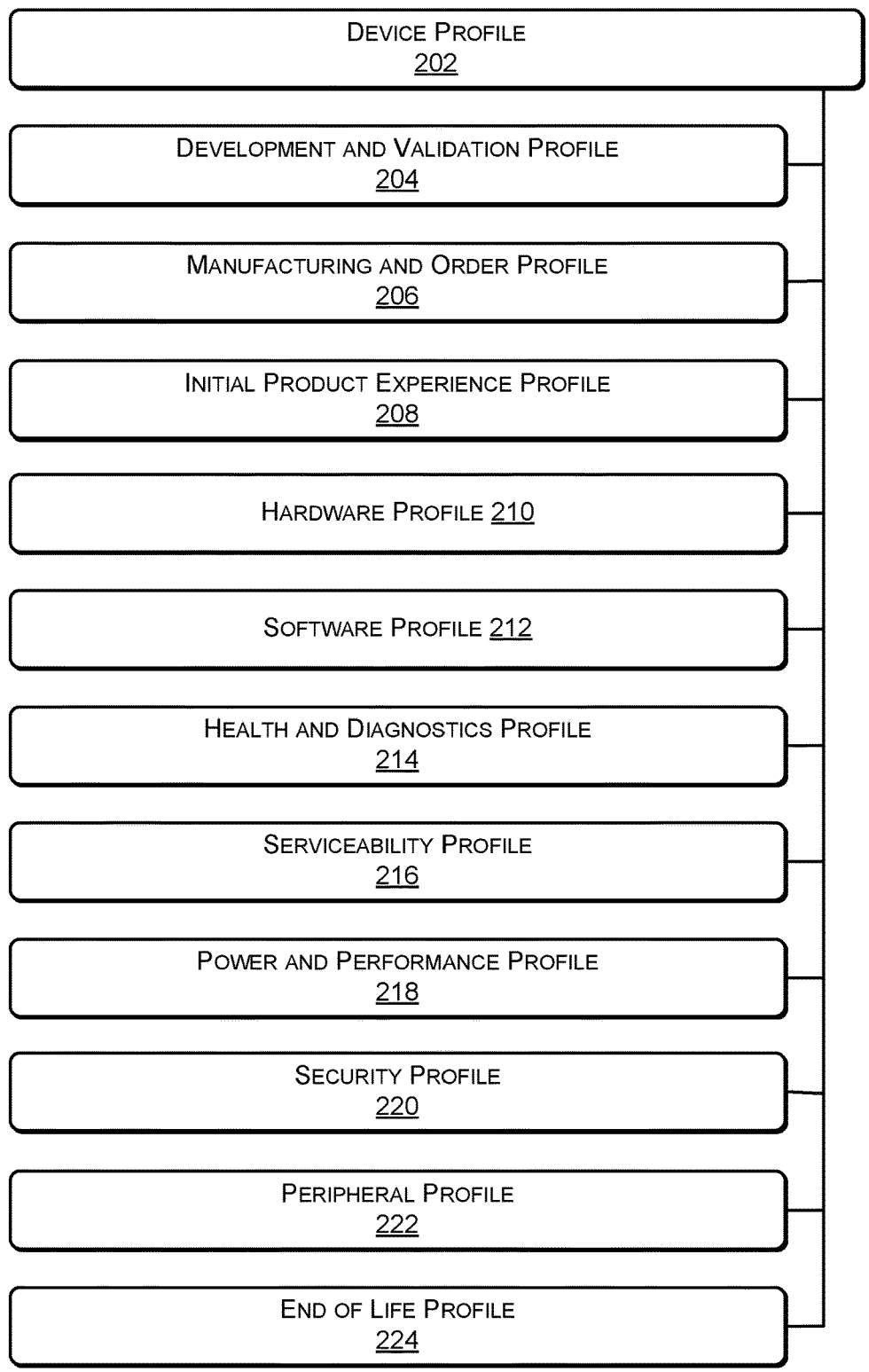
FIG. 2 is a block diagram illustrating a device profile, according to some embodiments.

FIG. 2 is a block diagram 200 illustrating a device profile, according to some embodiments. A device profile 202 (e.g., one of the device profiles 110 of FIG. 1) may include a development and validation profile 204, a manufacturing and order profile 206, an initial product experience profile 208, a hardware profile 210, a software profile 212, a health and diagnostics profile 214, a service ability profile 216, a power and performance profile 218, a security profile 220, a peripheral profile 222, an end of life profile 224, or any combination thereof.

The development and validation profile 204 may include information such as, for example, an identity of the development team, and identity of the validation team, when the product was developed, a validation report (e.g., which tests the device passed, which tests the device failed, and the like), bugs that were allowed to pass through, and other validation-related information.

The manufacturing and order profile 206 may include information as to which factory manufactured the computing device and whether the computing device was a build to order (BTO) device or build to stock (BTS) device. The manufacturing and order profile 206 may include burn in results, a customer name if the device was part of a bulk acquisition (e.g., lease or purchase) from a large customer (e.g., an enterprise customer), and a segment associated with the computing device. For example, many computing manufacturers make computers for different segments, such as a student segment, a consumer segment, a gaming segment, an enterprise segment, a workstation segment, a data center (e.g., server) segment, and the like. The manufacturing and order profile 206 may identify a sales channel, such as whether the sale was through: a national brick and mortar retailer, an internet retailer, a salesperson, the manufacturer's website on the internet, an enterprise portal, a small business portal, or other sales channel. The manufacturing order profile 206 may include information on the way (e.g., by air, by ground, expedited, etc.) in which the computing device was shipped, when the device was shipped, and entitlements (e.g., service entitlements and digital entitlements). For example, the service entitlements may include a type of warranty on various components of the computing device and the digital entitlements may include a software warranty on various software components installed on the computing device.

The initial product experience profile 208 may include information on which data (e.g., drivers, applications, and the like) the user downloaded, whether the user provided a review on the manufacturer's website for the computing device, and other information related to the initial experience for the user after the user received the product.

The hardware profile 210 may include information such as a current configuration of the computing device (e.g., which hardware components are currently installed), and a hardware usage profile describing how the current hardware components are being used.

The software profile 212 may include information about software applications, including gaming applications, and an operating system that are installed on the computing device. The software profile 212 may include how the operating system is configured, how each gaming application is configured, and how non-gaming applications are configured. For example, some non-gaming applications may be configured to setup background processes that interfere with gaming applications, adversely affecting the corresponding gaming metrics.

The health and diagnostics profile 214 may include information, such as various diagnostic logs, various alerts issued by software applications or by the agent, and other information related to health and diagnostics associated with the computing device.

The serviceability profile 216 may include information on the serviceability of the computing device including whether the device has been serviced and how often it has been serviced.

The power and performance profile 218 may include information on how the computing device consumes power and the type of performance (e.g., based on one or more benchmarks) that the computing device delivers. For example, the power may include whether the power profile is to conserve as much power as possible by turning off components that are not being used or whether the power profile is a server-like profile in which all components are always on (e.g., never turned off) regardless of whether they are being used or not. The performance portion of the power and performance profile 218 may include information on the type of performance that the computing device provides, such as, for example, how many instructions the processor can execute in a particular period of time, data input/output, memory input/output, bandwidth (e.g., via Ethernet, Wi-Fi, and the like), etc.

The security profile 220 may include how many different users log into the computing device, how (e.g., method by which) the users are authenticated, the BIOS settings, system management tools, and various other authentication-related information. For example, the methods of authentication may include the user providing a user name and password, or providing biometric information such as, for example, a fingerprint scan, a retinal scan, or facial scan.

The peripheral profile 222 may include a list of peripherals that have been connected to the computing device, the method of connection (e.g., what type of port was used), and information about when and how long the peripheral was connected. The end of life profile 224 may include information such as, for example, an extended entitlement, a lease return service tag, a return depot log, or other information indicating what happened when the lease was up or when the product was returned to the manufacturer for recycling.

Figure 3:
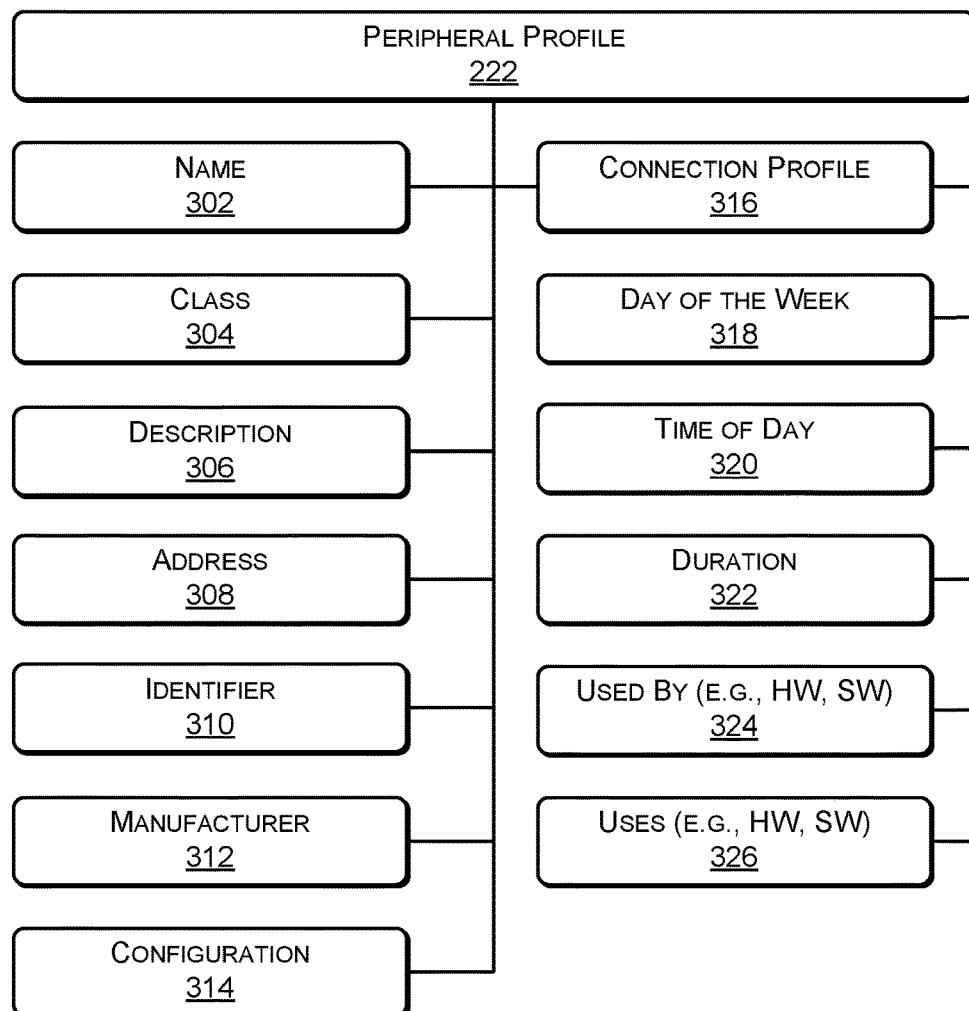
FIG. 3 is a block diagram illustrating a peripheral profile, according to some embodiments.

FIG. 3 is a block diagram 300 illustrating a peripheral profile, according to some embodiments. The peripheral profile 222 may include various information about which peripherals have been connected to the computing device, when they were connected, how long they were connected, and the like. For example, the peripheral profile 222 may include a name of the peripheral 302, a class of the peripheral 304, a description of the peripheral 306, an address of the peripheral 308, an identifier of the peripheral 310, a manufacturer of the peripheral 312, a configuration of the peripheral 314.

The name 302 may indicate a name of the peripheral such as mouse, controller, monitor, or another name. For example, devices that are set up and configured in a similar manner may be grouped together into a particular type of class. The description 306 may include a description as to what function the particular peripheral performs. For example, a mouse or controller may be described as providing various inputs to the computing device via a particular port (e.g., USB). An external monitor may be described as displaying content output from a particular port of the computing device.

The address 308 may indicate a particular address, such as an internal port address. The identifier 310 may include a unique identifier, such as a serial number, service tag, or other type of unique identifier. The manufacturer 312 may identify a manufacturer of the peripheral.

The configuration 314 may include configuration information associated with a peripheral. For example, the configuration 314 associated with the printer may indicate whether the printer is configured to print at the highest possible resolution, whether the printer is configured for toner saver, whether the printer is configured to print in draft mode, etc.

The peripheral profile 222 may include a connection profile 316. The connection profile 316 may indicate when and how often a particular peripheral is connected to the computing device. For example, the connection profile 316 may include a day of the week 318 during which the peripheral was connected, a time of day 320 at which the peripheral was connected, a duration 322 of the connection, a used by 324, and a uses 326. The used by 324 may indicate which hardware components and/or software applications are used by the particular peripheral. For example, an editing program that enables a user to touch up a scanned image may be used by a scanner. As another example, an external hard drive peripheral may be used by a backup software application to backup portions of the data on the computing device. The uses 326 may indicate which hardware components and/or software applications the peripheral uses. For example, the scanner may use a particular driver for scanning and send the scan to a particular software application for editing. The uses 326 may include information such as which port (e.g., USB 2.0, USB 3.0, USB-C, ThunderBolt®, and the like) the peripheral connects through and the throughput of the port.

Figure 4:
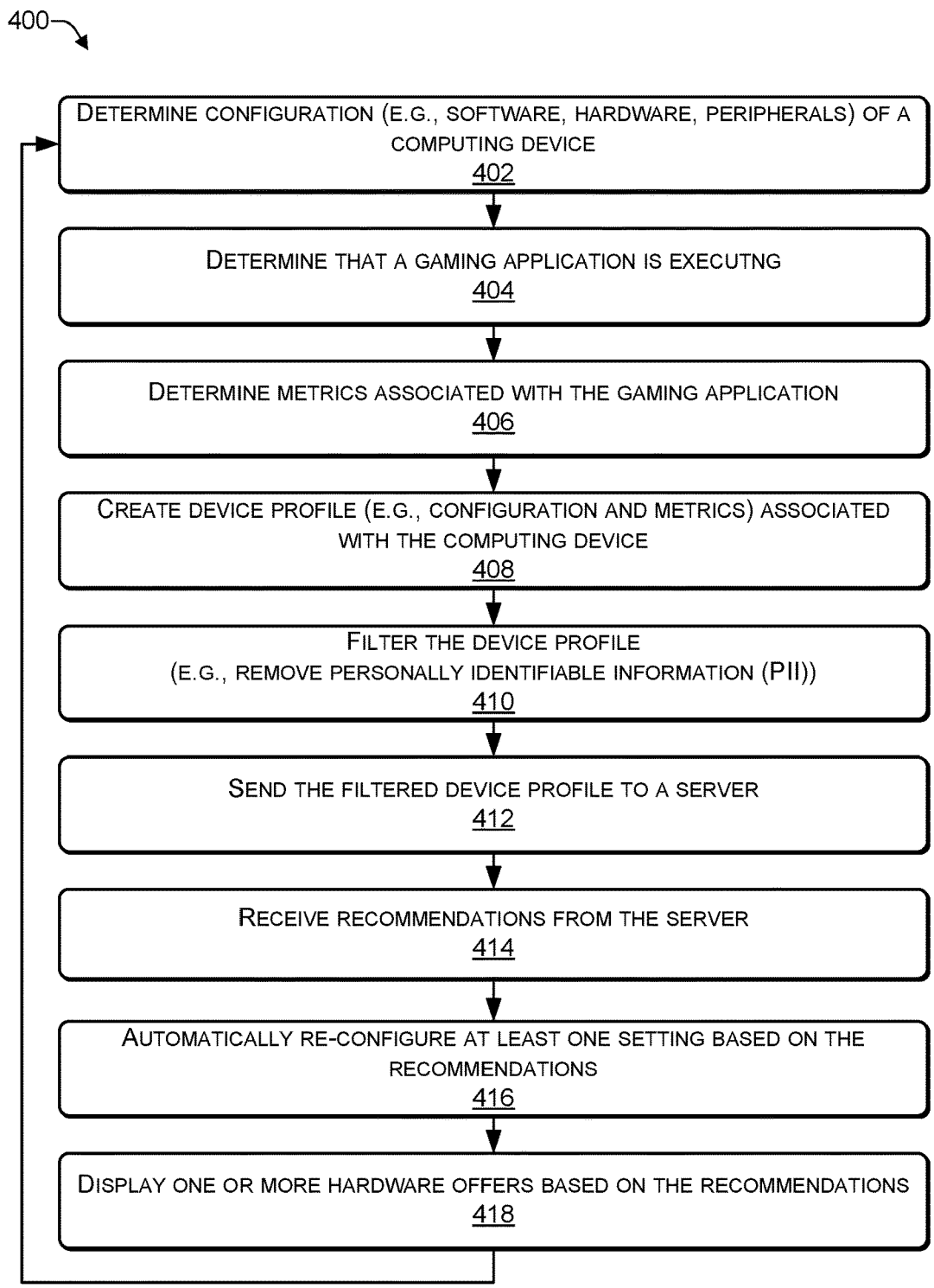
FIG. 4 is a flowchart of a process that includes sending a device profile to a server according to some embodiments.
Figure 5:
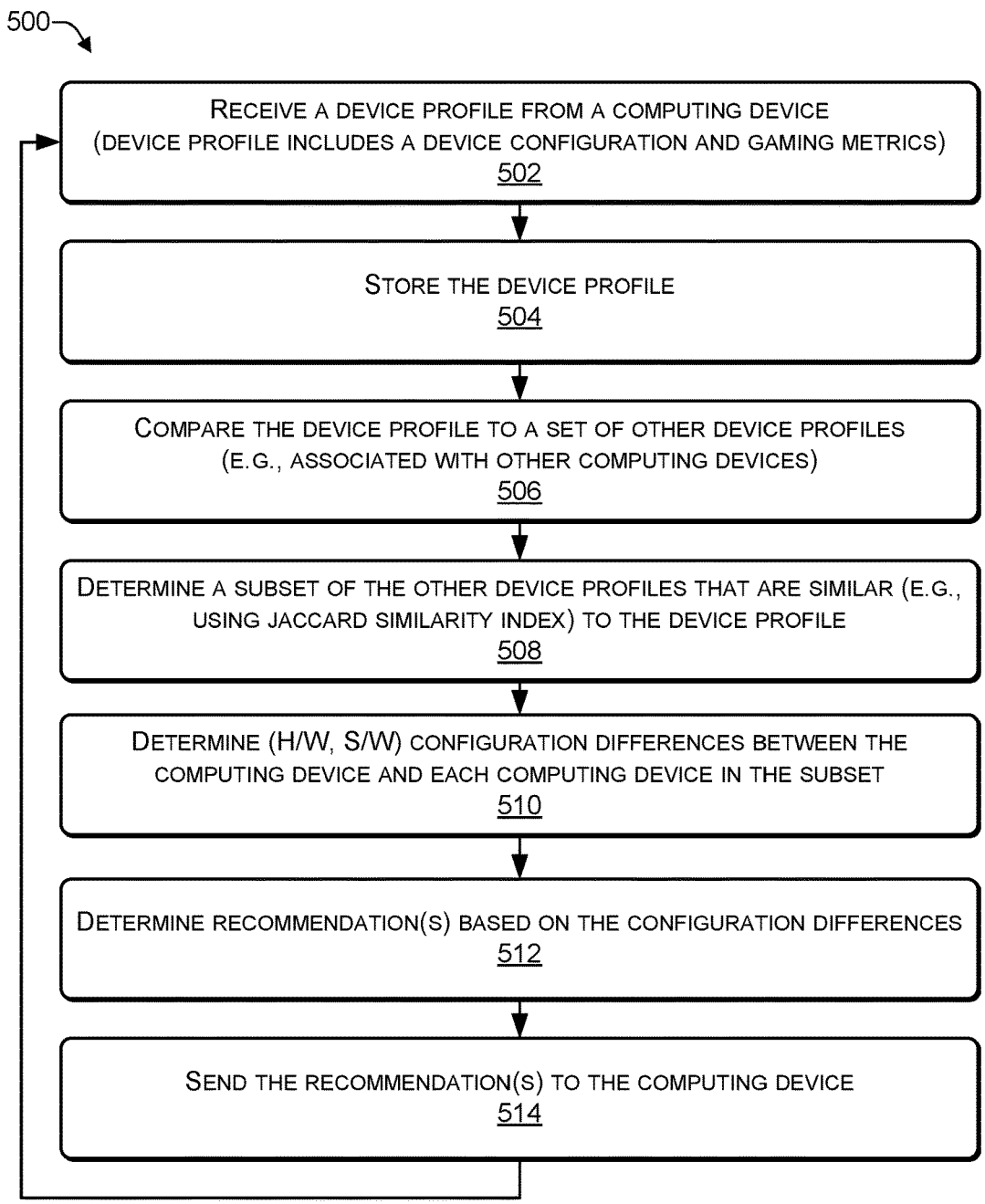
FIG. 5 is a flowchart of a process that includes sending recommendation(s) to a computing device according to some embodiments.
Figure 6:
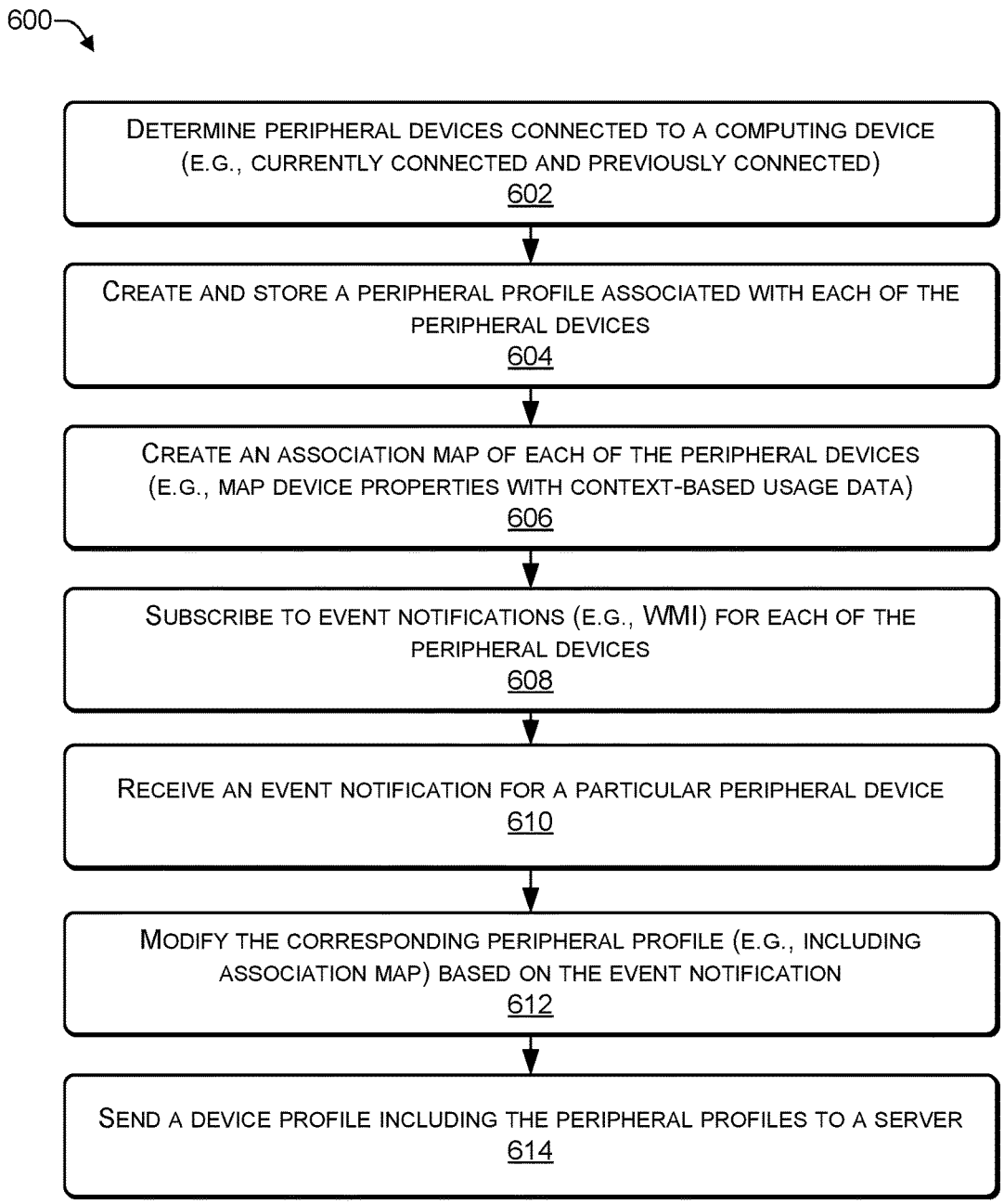
FIG. 6 is a flowchart of a process that includes creating an association map of a peripheral device according to some embodiments.

In the flow diagrams of FIG. 4, FIG. 5, and FIG. 6 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400, 500, and 600 are described with reference to FIGS. 1, 2, and 3, as described above, although other models, frameworks, systems and environments may be used to implement this process.

FIG. 4 is a flowchart of a process 400 that includes sending a device profile to a server according to some embodiments. The process 400 may be performed by an agent, such as one of the agents 108 of FIG. 1.

At 402, the agent may determine a configuration (e.g., software, hardware, and peripherals) of a computing device. At 404, the agent may determine that execution of a gaming application has been initiated. At 406, the agent may gather metrics associated with the gaming application while the gaming application is executing. At 408, the agent may create a device profile (e.g., that includes the configuration and the metrics). For example, in FIG. 1, the agent 108 may determine the hardware configuration associated with the computing device 102. The agent 108 may determine the software applications, including gaming applications, installed on the computing device 102, when the applications are used, how often they are used, and metrics associated with the gaming applications. For example, some gaming applications may be installed on the computing device 102 but may not be used. As another example, some gaming applications may be used regularly while some applications may only be used occasionally. The agent may determine a usage of peripheral devices, such as which types of devices (e.g., monitor(s), controller(s), and the like) are connected to the computing device, when they are used, how long they are used, which gaming applications and/or hardware components the peripheral devices use and which gaming applications and hardware components make use of the peripheral devices.

At 410, the device profile may be filtered (e.g., to remove PII). At 414, the filtered device profile may be sent to a server. For example, in FIG. 1, the agent 108 may use the filter 120 to remove PII and any other information that could be used to identify the user of the computing device, such as legal name, credit card information, phone numbers, addresses, or other information that could lead to identifying a user of a computing device. After filtering the usage profile 110 using the filter 120, the agent 108 may send the usage data 144 to the server 104.

At 414, recommendations may be received from the server. At 416, at least one of software, hardware, or peripherals may be automatically reconfigured at least in part based on the recommendations received from the server. For example, in FIG. 1, after the agent 108 has sent the usage data 144 to the server 104, the server 104 may send the recommendations 146. The recommendations 146 may be based on other computing devices that have similar hardware and execute one or more of the same (or similar) gaming applications. The recommendations may be based on identifying similar device profiles (associated with computing devices with similar hardware) that execute the similar (or the same) gaming applications and determining that at least one of the similar computing devices mas better metrics, such as, for example, increased FPS, increased APM, decreased completion time, reduced latency, and the like compared to the computing device that sent the usage data 144. The server 104 may identify, using machine learning, the differences between the computing device and the faster performing similar device(s).

The recommendations 146 may be based on the differences (e.g., in hardware, software, peripherals, configuration, and settings) between the computing device and the similar device(s) with better metrics. For example, the differences may include differences in a device driver, firmware, or configuration of a hardware component, differences in a version, edition, or configuration of a software component, differences in a device driver, firmware, or configuration of a peripheral, and the like. By implementing the recommendations 146, the computing device 102 may be able to improve the metrics 118. The agent may automatically (e.g., without human interaction) perform one or more of the recommendations 146, such as, for example, (1) downloading and installing a different driver, newer firmware, or a newer software version, (2) reconfiguring a software application, a hardware component, or a peripheral, and the like. The agent may offer recommendations to purchase software upgrades, hardware upgrades, newer peripherals, and the like.

FIG. 5 is a flowchart of a process 500 that includes sending a recommendation to a computing device according to some embodiments. For example, the process 500 may be performed by the server 104 of FIG. 1.

At 502, a device profile may be received from a computing device. At 504, the device profile may be stored. At 506, the device profile may be compared to a set of other device profiles associated with other computing devices. At 508, a subset of the other device profiles that are similar to the device profile of the computing device may be determined. For example, in FIG. 1, the server 104 may receive the device profile 144 from the computing device 102(1). The server for 104 may use the machine learning module 124 to compare the usage data 144 with at least some of profiles from the profiles 122(2) to the profile 122(N) to identify the similar profiles 126 from the set of profiles 120. For example, the recommendation engine 128 may determine the similar profiles 126 based on calculating the similarity index 142 between the usage data associated with the computing device 102(1) and individual profiles 122 in the set of profiles 120.

At 510, configuration differences between the computing device (associated with the device profile that was received by the server) and each of the similar computing devices in the subset (e.g., the similar profiles 126) may be determined. At 512, one or more recommendations may be determined based on the configuration (e.g., software, hardware, peripherals, and settings) differences. At 514, the recommendations may be sent to the computing device. For example, in FIG. 1, the server 104 may determine configuration differences between the usage data 144 and the similar profiles 126 to identify configuration differences that enable the similar computing devices (associated with the similar profiles 126) to execute similar (or identical) gaming applications with better metrics. The recommendation engine 128 may determine various recommendations including software recommendations 130, peripheral recommendations 132, O/S configuration recommendations 134, hardware recommendations 136, configuration recommendations 138, or any combination thereof and send the recommendations 146 to the computing device 102.

FIG. 6 is a flowchart of a process 600 that includes creating an association map of a peripheral device according to some embodiments. The process 600 may be performed by an agent installed on a computing device, such as the agents 108 of FIG. 1.

At 602, an agent may determine peripheral devices that are (either currently or previously) connected to a computing device. At 604, the agent may create and store a peripheral profile corresponding to individual peripheral devices (of the peripheral devices that were determined to be connected to the computing device). For example, in FIG. 1, each of the agents 108 may retrieve properties of plug and play (PnP) device instances that have been connected to the host computing device from an operating system of the computing device 102. To illustrate, when the operating system is Microsoft® Windows®, the agent may use Setup Application Programming Interface (API). The agents 108 may assign a unique identifier, such as a container identifier (ID) in Windows®, to each peripheral device. The container ID is a system-supplied device identification string that uniquely groups functional devices associated with a single-function or multifunction device that is or has been connected to the computer. A PnP manager of the operating system uses the container ID to group one or more device nodes that originated from and belong to each instance of a particular physical device (e.g., peripheral device). Each instance is referred to as a device container and each device container has a corresponding unique container ID. The agents 108 may use the container ID to create a dictionary of device properties that group together functional device instances of a single physical peripheral device based on the container ID. Each peripheral profile may be identified using the container ID. For example, the agent 108(N) may create and store, on the local host (e.g., the computing device 102(N)) the individual peripheral profiles corresponding to the peripheral devices.

At 606, the agent may create an association map of individual peripheral devices (e.g., by mapping device properties with context-based usage data, such as the connection profile 316 of FIG. 3). For example, in FIG. 1, the agents 108 may map a set of property key-values to a single physical peripheral device. By doing so, the same peripheral device can be identified each time the peripheral device is connected to a host computing device. In a Windows® system, a peripheral device that is connected via a USB port to a host computing device may appear as multiple individual functional devices within the same container ID. For example, a single headset device connected via USB to the host computing device may appear as (1) a headset earphone and a headset with microphone under an "audio inputs and outputs" category of the Device Manager, (2) an HID-compliant headset under the "Human Interface Devices (HID)" category, and (3) a USB composite device under the "Universal Serial Bus controllers" category. By mapping the set of property key-values to a single physical peripheral device (e.g., the USB headset with microphone), the same peripheral device can be identified each time the peripheral device is connected to a host computing device, regardless of which port is used to make the connection.

At 608, the agent may subscribe to event notifications for each of the peripheral devices. At 610, the agent may receive an event notification for a particular peripheral device. At 612, the agent may (e.g., in response to receiving the event notification), modify the corresponding peripheral profile (including the associated map) based on the event notification. For example, the agents 108 may subscribe to event notifications using a service, such as, for example, Windows® Management Instrumentation (WMI), offered by an operating system of the computing devices 102. When a PnP peripheral device is connected to a port of the host computing device (e.g., one of the devices 102), the event notification manager (e.g., WMI in Windows®) may send an event notification to subscribers, including the corresponding one of the agents 108. The agent may map the event notification to a peripheral device profile using the associative model and update the corresponding peripheral device profile.

At 614, the agent may send the device profile that includes the peripheral profiles to the server. For example, in FIG. 1, each of the agents 108 may periodically (e.g., at a predetermined interval), such as, for example, every month, every 3 months, every 6 months, every year, or the like, send the device profile 144 (e.g., one of the device profiles 110) that includes the peripheral profile 116, to the server 104. In response, the server 104 may send the recommendations 146. The recommendations 146 may be based on other computing devices that have similar hardware and execute one or more of the same (or similar) gaming applications. The recommendations may be based on identifying similar device profiles (associated with computing devices with similar hardware) that execute the similar (or the same) gaming applications and determining that at least one of the similar computing devices mas better metrics, such as, for example, increased FPS, increased APM, decreased completion time, reduced latency, and the like compared to the computing device that sent the usage data 144. The server 104 may identify, using machine learning, the differences between the computing device and the faster performing similar device(s). The recommendations 146 may be based on the differences (e.g., in hardware, software, peripherals, configuration, and settings) between the computing device and the similar device(s) with better metrics. For example, the differences may include differences in a device driver, firmware, or configuration of a hardware component, differences in a version, edition, or configuration of a software component, differences in a device driver, firmware, or configuration of a peripheral, and the like. By implementing the recommendations 146, the computing device 102 may be able to improve the metrics 118. The agent may automatically (e.g., without human interaction) perform one or more of the recommendations 146, such as, for example, (1) downloading and installing a different driver, newer firmware, or a newer software version, (2) reconfiguring a software application, a hardware component, or a peripheral, and the like. The agent may offer recommendations to purchase software upgrades, hardware upgrades, newer peripherals, and the like.

Thus, in Windows®, a single device may functionally be placed into multiple categories. By creating a peripheral profile for each peripheral device that has been or is current connected to a host computing device, a particular peripheral device can be identified each time the particular peripheral device is connected. The process 600 enables identification of each unique peripheral device across multiple connect/disconnect cycles and consolidate the multiple functional views provided by an operating system, such as Windows®. The process 600 is agnostic of the type of connection (e.g., USB, high definition media interface (HDMI), Bluetooth®, HMDI, BT, Thunderbolt® and the like). The process 600 enables peripheral profiles of previously connected peripheral devices to be created before the agent subscribes to event notifications. The process 600 enables peripheral profiles to be created and updated without polling to identify peripheral devices, thereby reducing the use of computing resources.

Figure 7:
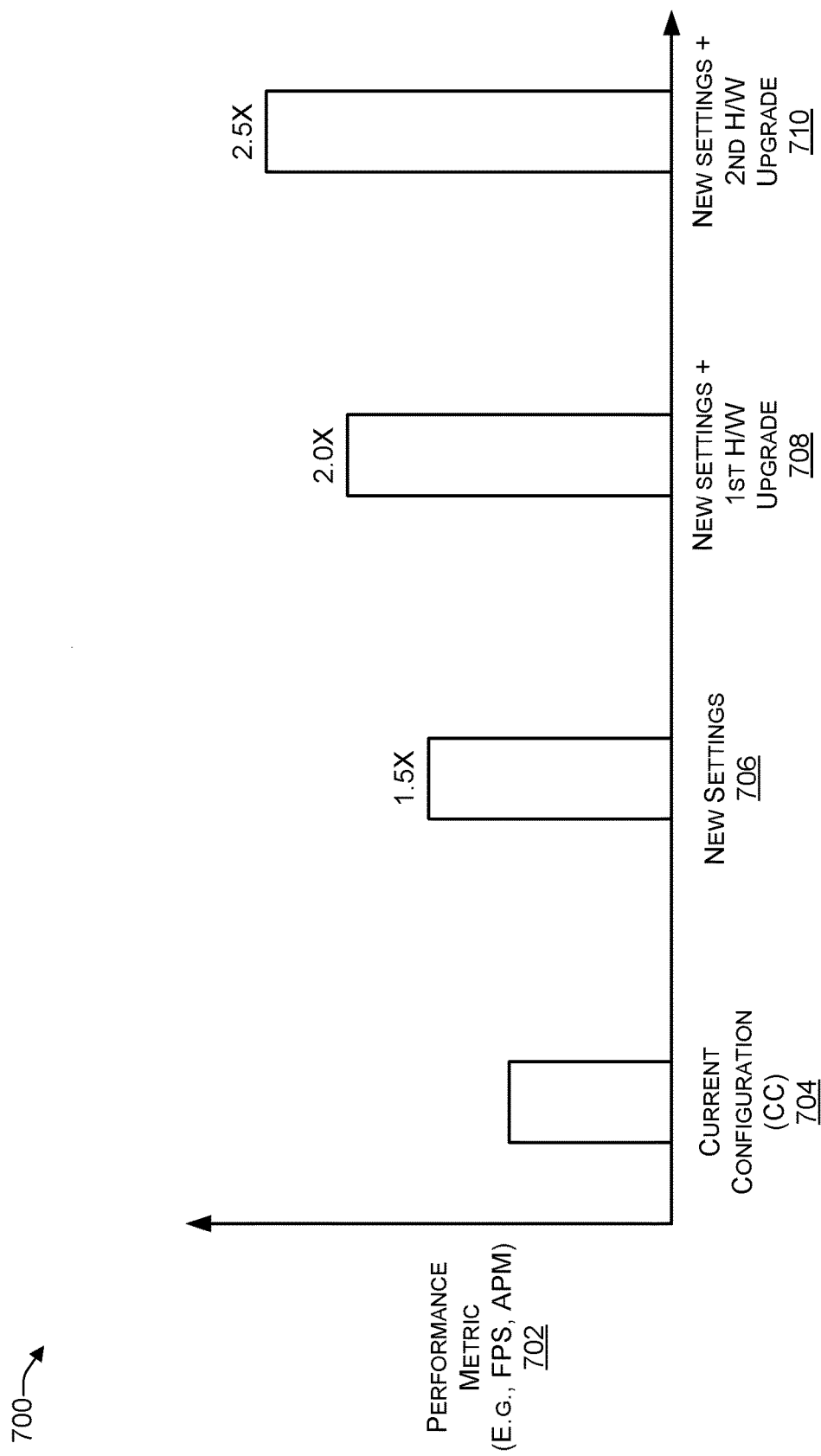
FIG. 7 is a block diagram illustrating multiple recommendations, according to some embodiments.

FIG. 7 is a block diagram 700 illustrating multiple recommendations, according to some embodiments. For example, in FIG. 1, after receiving the recommendations 146 from the server 104, the agent 108(N) may display various options and a corresponding change (e.g., increase or decrease) in the performance metric 702. The agent 108(N) may display at least one gaming-related performance metric 702, display a performance for the metric 702 using a current configuration 704 of the computing device 102(N), and display at least one option to improve the performance metric 702. A first option may include modifications to settings of one or more applications and/or an operating system associated with the computing device 108(N) to create new settings 706. In some cases, the agent may automatically perform the modifications to create the new settings 706. A second option may include the new settings 706 and a first hardware upgrade 708. For example, the first hardware upgrade 708 may include a recommendation to purchase a new video card to replace an existing (e.g., slower) video card. A third option may include the new settings 706 and a second hardware upgrade 710. For example, the second hardware upgrade 708 may include a recommendation to purchase a new computing device to replace an existing (e.g., slower) computing device.

While three options 706, 708, 710 are illustrated in FIG. 7, the recommendations 146 may include zero or more options, including more than three options. The agent 108(N) may display an offer to purchase the hardware upgrades (e.g., 708, 710) from a site, such as, for example, an ecommerce website associated with Dell®. In some cases, the offer may include a coupon or a discount, e.g., "Because you already own an Alienware® gaming machine, we are offering you a 20% discount on hardware upgrades, including video card XYZ that supports 60 fps and dual 4 k monitors."

Figure 8:
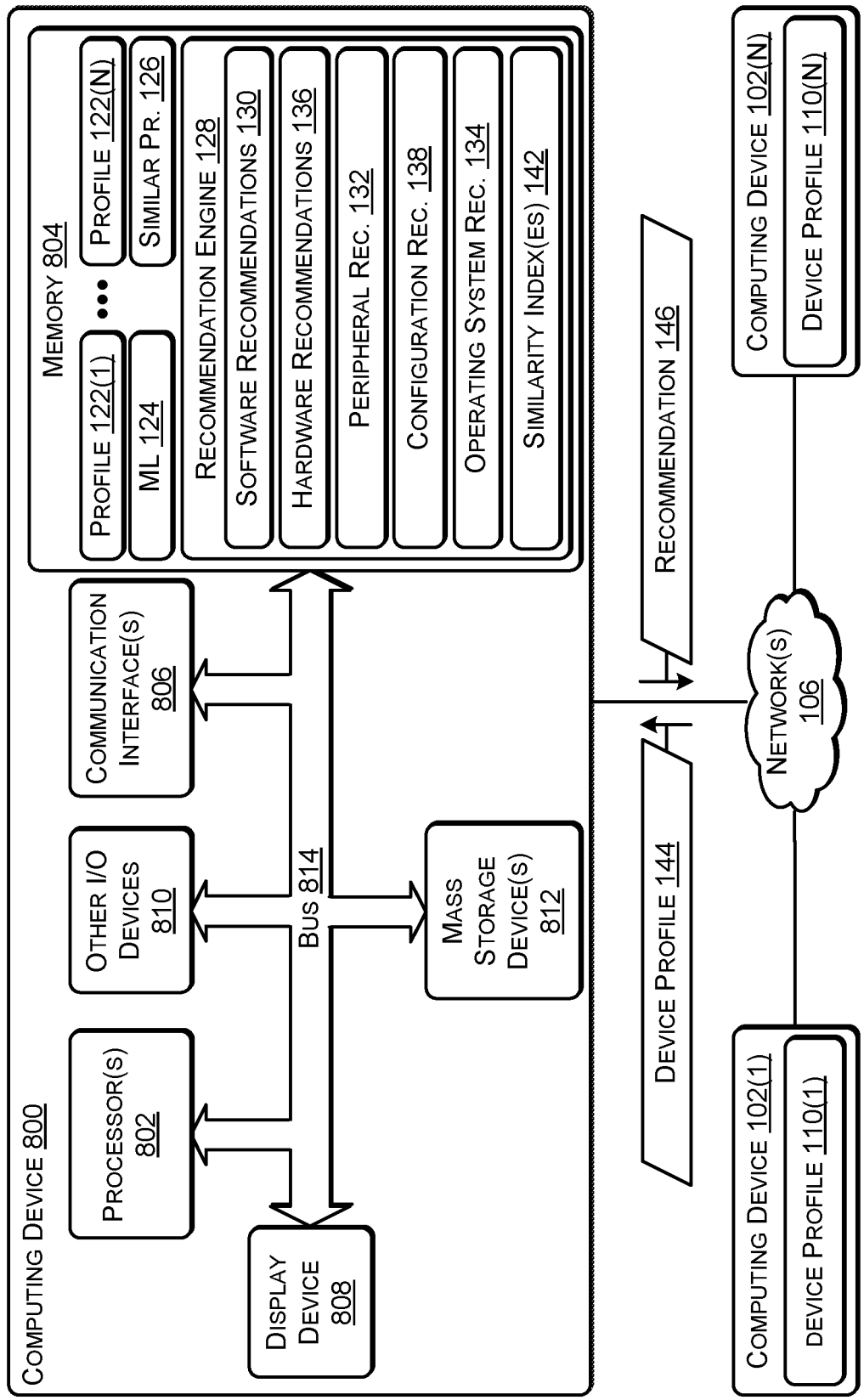
FIG. 8 illustrates an example configuration of a computing device that can be used to implement the systems and techniques described herein.

FIG. 8 illustrates an example configuration of a computing device 800 that can be used to implement the systems and techniques described herein, such as for example, the computing devices 102 and/or the server 104 of FIG. 1. In FIG. 8, the computing device 800 is illustrated as implementing the server 104 of FIG. 1.

The computing device 800 may include one or more processors 802 (e.g., CPU, GPU, or the like), a memory 804, communication interfaces 806, a display device 808, other input/output (I/O) devices 810 (e.g., keyboard, trackball, and the like), and one or more mass storage devices 812 (e.g., disk drive, solid state disk drive, or the like), configured to communicate with each other, such as via one or more system buses 814 or other suitable connections. While a single system bus 814 is illustrated for ease of understanding, it should be understood that the system buses 814 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 802 are one or more hardware devices that may include a single processing unit or a number of processing units, all of which may include single or multiple computing units or multiple cores. The processors 802 may include a graphics processing unit (GPU) that is integrated into the CPU or the GPU may be a separate processor device from the CPU. The processors 802 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 802 may be configured to fetch and execute computer-readable instructions stored in the memory 804, mass storage devices 812, or other computer-readable media.

Memory 804 and mass storage devices 812 are examples of computer storage media (e.g., memory storage devices) for storing instructions that can be executed by the processors 802 to perform the various functions described herein. For example, memory 804 may include both volatile memory and non-volatile memory (e.g., RAM, ROM, or the like) devices. Further, mass storage devices 812 may include hard disk drives, solid-state drives, removable media, including external and removable drives, memory cards, flash memory, floppy disks, optical disks (e.g., CD, DVD, Blu-ray, and the like), a storage array, a network attached storage, a storage area network, or the like. Both memory 804 and mass storage devices 812 may be collectively referred to as memory or computer storage media herein and may be any type of non-transitory media capable of storing computer-readable, processor-executable program instructions as computer program code that can be executed by the processors 802 as a particular machine configured for carrying out the operations and functions described in the implementations herein.

The computing device 800 may include one or more communication interfaces 806 for exchanging data via the network 110. The communication interfaces 806 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 806 can also provide communication with external storage, such as a storage array, network attached storage, storage area network, cloud storage, or the like.

The display device 808 may be used for displaying content (e.g., information and images) to users. Other I/O devices 810 may be devices that receive various inputs from a user and provide various outputs to the user, and may include a keyboard, a touchpad, a mouse, a printer, audio input/output devices, and so forth.

The computer storage media, such as memory 116 and mass storage devices 812, may be used to store software and data. For example, the computer storage media may be used to store the profiles 122, the machine learning module 124, the similar profiles 126, and the recommendation engine 128.

Thus, each of the computing devices 102 may have an agent that gathers information about the software configuration, the hardware configuration, and peripherals associated with the computing device 102 and how they are being used. For example, the agent 108 may gather information about which gaming applications are installed, which gaming applications are being used, how long each gaming application is being used, tasks that each gaming application is performing, and the like. The agent 108 may keep track of various gaming-related performance metrics associated with the gaming applications executed by the computing device 102. The agent 108 may create the device profile 110 that includes a software profile, a hardware profile, a peripheral profile, and gaming performance metrics. The agent 108 may gather information on software usage, hardware usage, peripheral usage, and events at a predetermined time interval and/or when an event occurs or when usage of a software application, hardware component, or peripheral is detected and update the device profile 110.

After the agent 108 has gathered the information, the agent 108 may apply a filter to the information in the device profile 110 to filter out PII that could potentially be used to identify a user of the computing device 108. After the agent 108 has applied the filter 120 to the information in the device profile 110, the agent 108 may periodically (e.g., at a predetermined interval) or in response to a user request, send the device profile 144, e.g., one of the device profiles 110(1) to 110(N), to the server 104. The server 104 may compare the device profile 144 with other profiles from the profiles 122. The comparison may be performed by a software component executing on the server 104, such as the machine learning module 124. The machine learning module 124 may identify the similar profiles 126 that include profiles from the set of profiles 120 that are similar to the device profile 144 in terms of hardware components, gaming applications, peripherals and the like. The recommendation engine 128 may analyze the similar profiles 126 to identify recommendations that can be provided to improve the performance metrics 118(N). For example, the recommendation engine 128 may determine that the same gaming application is installed on both the computing device 102(1) and the similar computing device 102(N), but the gaming application has batter metrics on the computing device 102(1) than the computing device 102(N). The recommendation engine 128 may analyze the device profile 110(1) and determine that the reason why the software application executes faster is because the computing device 102(1) has particular software settings and/or hardware/peripheral components that the computing drive 102(N) does not have. In this example, the recommendations 146 provided by the recommendation engine 128 may include a recommendation that the software settings of computing device 102(N) be modified and the hardware/peripherals upgraded.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement pre-scribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving, by one or more processors and from a computing device, a device profile identifying a gaming application and metrics associated with execution of the gaming application that is installed on the computing device;
performing, by the one or more processors, a comparison of the device profile with other device profiles associated with other computing devices;
determining, by the one or more processors and based on the comparison, a similarity index of the device profile with the other device profiles, wherein the similarity index comprises one of a Jaccard index, a Simple Matching Coefficient, a Hamming distance, a Sorensen-Dice coefficient, a Tversky index, or a Tanimoto distance;
selecting, by the one or more processors, a subset of the other device profiles based at least in part on the similarity index, wherein:
the subset of the other devices profiles are associated with a subset of the other computing devices; and
the gaming application is installed on individual computing devices of the subset of the other computing devices;
determining, by the one or more processors, one or more configuration differences between the device profile of the computing device and individual device profiles of the subset of the other device profiles;
determining, by the one or more processors, one or more configuration recommendations based on the one or more configuration differences; and
sending, by the one or more processors, the one or more configuration recommendations to the computing device.

2. The method of claim 1, wherein the device profile comprises:
a hardware profile that identifies:
one or more hardware components associated with the computing device, the one or more hardware components comprising:
components included in the computing device; and
peripheral devices connected to the computing device, wherein the peripheral devices include at least one display device and at least one gaming controller; and
the metrics associated with execution of the gaming application, the metrics comprising a video resolution, an average frame rate, and an average number of actions per minute.

3. The method of claim 2, wherein performing the comparison of the device profile with the other device profiles associated with other computing devices comprises:
comparing:
the hardware profile of the computing device with
a second hardware profile of a second computing device of the other computing devices; and
comparing:
the metrics associated with execution of the gaming application by the computing device with
second metrics associated with execution of the gaming application by the second computing device of the other computing devices.

4. The method of claim 1, wherein the device profile excludes personally identifiable information of a user of the computing device.

5. The method of claim 1, wherein the one or more configuration differences comprise at least one of:
a software configuration difference between:
the gaming application that is installed on the computing device; and
the gaming application installed on the individual computing devices of the subset of the other computing devices;
an operating system configuration difference between:
an operating system that is installed on the computing device; and
the operating system that is installed on the individual computing devices of the subset of the other computing devices; or
a hardware configuration difference between a hardware component included in:
the computing device; and
the individual computing devices of the subset of the other computing devices.

6. The method of claim 1, wherein the one or more configuration recommendations comprise at least one of:
one or more software configuration modifications to a software configuration of the gaming application that is installed on the computing device;
one or more operating system settings modifications to the operating system that is installed on the computing device;
one or more hardware configuration modifications to a hardware configuration of at least one hardware component that is included in the computing device; or
one or more peripheral configuration modifications to a peripheral configuration at least one peripheral device that is associated with the computing device.

7. The method of claim 1, wherein the one or more configuration recommendations comprise at least one of:
installing, on the computing device, a newer version of a particular gaming application;
uninstalling, from the computing device, a currently installed hardware component;
installing, in the computing device, a particular hardware component; or
connecting a recommended peripheral device to the computing device.

8. A server comprising:
one or more processors; and
one or more non-transitory computer readable media storing instructions executable by the one or more processors to perform operations comprising:
receiving, from a computing device, a device profile identifying a gaming application and metrics associated with execution of the gaming application that is installed on the computing device;
performing a comparison of the device profile with other device profiles associated with other computing devices;
determining, based on the comparison, a similarity index of the device profile with the other device profiles, wherein the similarity index comprises one of a Jaccard index, a Simple Matching Coefficient, a Hamming distance, a Sorensen-Dice coefficient, a Tversky index, or a Tanimoto distance;
selecting a subset of the other device profiles based at least in part on the similarity index wherein:

the subset of the other devices profiles are associated with a subset of the other computing devices; and the gaming application is installed on individual computing devices of the subset of the other computing devices;

determining one or more configuration differences between the device profile of the computing device and individual device profiles of the subset of the other device profiles;

determining one or more configuration recommendations based on the one or more configuration differences; and sending the one or more configuration recommendations to the computing device.

9. The server of claim 8, wherein the device profile comprises:
a hardware profile that identifies:
one or more hardware components associated with the computing device, the one or more hardware components comprising:
components included in the computing device; and
peripheral devices connected to the computing device, wherein the peripheral devices include at least one display device and at least one gaming controller; and
the metrics associated with execution of the gaming application, the metrics comprising a video resolution, an average frame rate, and an average number of actions per minute.

10. The server of claim 9, wherein performing the comparison of the device profile with the other device profiles associated with other computing devices comprises:
comparing:
the hardware profile of the computing device with a second hardware profile of a second computing device of the other computing devices; and
comparing:
the metrics associated with execution of the gaming application by the computing device with second metrics associated with execution of the gaming application by the second computing device of the other computing devices.

11. The server of claim 8, wherein the one or more configuration differences comprise at least one of:
a software configuration difference between:
the gaming application that is installed on the computing device; and
the gaming application installed on the individual computing devices of the subset of the other computing devices;
an operating system configuration difference between:
an operating system that is installed on the computing device; and
the operating system installed on the individual computing devices of the subset of the other computing devices; or
a hardware configuration difference between a hardware component included in
the computing device; and
the individual computing devices of the subset of the other computing devices.

12. The server of claim 8, wherein the one or more configuration recommendations comprise at least one of:
one or more software configuration modifications to a software configuration of the gaming application that is installed on the computing device;
one or more operating system settings modifications to the operating system that is installed on the computing device;
one or more hardware configuration modifications to a hardware configuration of at least one hardware component that is included in the computing device; or
one or more peripheral configuration modifications to a peripheral configuration at least one peripheral device that is associated with the computing device.

13. The server of claim 8, wherein the one or more configuration recommendations comprise at least one of:
installing, on the computing device, a newer version of a particular gaming application;
uninstalling, from the computing device, a currently installed hardware component;
installing, in the computing device, a particular hardware component; or
connecting a recommended peripheral device to the computing device.

14. One or more non-transitory computer readable media storing instructions executable by one or more processors to perform operations comprising:
receiving, from a computing device, a device profile identifying a gaming application and metrics associated with execution of the gaming application that is installed on the computing device;
performing a comparison of the device profile with other device profiles associated with other computing devices;
determining, based on the comparison, a similarity index of the device profile with the other device profiles, wherein the similarity index comprises one of a Jaccard index, a Simple Matching Coefficient, a Hamming distance, a Sorensen-Dice coefficient, a Tversky index, or a Tanimoto distance;
selecting a subset of the other device profiles based at least in part on the similarity index, wherein:
the subset of the other devices profiles are associated with a subset of the other computing devices; and
the gaming application is installed on individual computing devices of the subset of the other computing devices;
determining one or more configuration differences between the device profile of the computing device and individual device profiles of the subset of the other device profiles;
determining one or more configuration recommendations based on the one or more configuration differences; and
sending the one or more configuration recommendations to the computing device.

15. The one or more non-transitory computer readable media of claim 14, wherein the device profile comprises:
a hardware profile that identifies:
one or more hardware components associated with the computing device, the one or more hardware components comprising:
components included in the computing device; and
peripheral devices connected to the computing device, wherein the peripheral devices include at least one display device and at least one gaming controller; and
the metrics associated with execution of the gaming application, the metrics comprising a video resolution, an average frame rate, and an average number of actions per minute.

16. The one or more non-transitory computer readable media of claim 15, wherein performing the comparison of the device profile with the other device profiles associated with other computing devices comprises:

comparing the hardware profile of the computing device with a particular hardware profile of a particular other computing device of the other computing devices; and comparing the metrics with other metrics associated with the gaming application being executed by the other computing devices.

17. The one or more non-transitory computer readable media of claim 14, wherein the device profile excludes personally identifiable information of a user of the computing device.

18. The one or more non-transitory computer readable media of claim 14, wherein the one or more configuration differences comprise at least one of:

a software configuration difference between:
the gaming application that is installed on the computing device; and
the gaming application installed on the individual computing devices of the subset of the other computing devices;

an operating system configuration difference between:
an operating system that is installed on the computing device; and
the operating system that is installed on the individual computing devices of the subset of the other computing devices; or a hardware configuration difference between a hardware component included in:
the computing device; and
the individual computing devices of the subset of the other computing devices.

19. The one or more non-transitory computer readable media of claim 14, wherein the one or more configuration recommendations comprise at least one of:

one or more software configuration modifications to a software configuration of the gaming application that is installed on the computing device;

one or more operating system settings modifications to the operating system that is installed on the computing device;

one or more hardware configuration modifications to a hardware configuration of at least one hardware component that is included in the computing device; or one or more peripheral configuration modifications to a peripheral configuration at least one peripheral device that is associated with the computing device.

20. The one or more non-transitory computer readable media of claim 14, wherein the one or more configuration recommendations comprise at least one of:

installing, on the computing device, a newer version of a particular gaming application;

uninstalling, from the computing device, a currently installed hardware component;

installing, in the computing device, a particular hardware component; or connecting a recommended peripheral device to the computing device.

\* \* \* \* \*